(12) United States Patent
Kanzow et al.

(10) Patent No.: US 11,982,335 B2
(45) Date of Patent: May 14, 2024

(54) DRIVE BELT, USE OF A DRIVE BELT OF THIS TYPE AS A V-RIBBED BELT, AND PRODUCTION METHOD

(71) Applicant: ContiTech Antriebssysteme GmbH, Hannover (DE)

(72) Inventors: Henning Kanzow, Wedemark (DE); Antonius Dikmans, Seelze (DE); Reinhard Teves, Hannover (DE); Manfred Bonkowski, Hannover (DE); Christian Greiner, Hannover (DE); Timo Sebastian Kasak, Langenhagen (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 175 days.

(21) Appl. No.: 17/756,631

(22) PCT Filed: Oct. 16, 2020

(86) PCT No.: PCT/EP2020/079163
§ 371 (c)(1),
(2) Date: May 27, 2022

(87) PCT Pub. No.: WO2021/104745
PCT Pub. Date: Jun. 3, 2021

(65) Prior Publication Data
US 2023/0003281 A1 Jan. 5, 2023

(30) Foreign Application Priority Data
Nov. 29, 2019 (DE) ...................... 10 2019 218 579.7

(51) Int. Cl.
*F16G 5/08* (2006.01)
*D02G 3/02* (2006.01)
(Continued)

(52) U.S. Cl.
CPC ................ *F16G 5/08* (2013.01); *D02G 3/02* (2013.01); *D02G 3/047* (2013.01); *D02G 3/26* (2013.01);
(Continued)

(58) Field of Classification Search
CPC .... F16G 5/08; F16G 1/10; F16G 5/20; D02G 3/02; D02G 3/047; D02G 3/26;
(Continued)

(56) References Cited

U.S. PATENT DOCUMENTS

| 4,083,260 A | 4/1978 | Carlson et al. | |
| 2013/0217528 A1* | 8/2013 | Matsumoto | F16G 1/10 427/407.1 |

(Continued)

FOREIGN PATENT DOCUMENTS

| DE | 102011002230 A1 * | 10/2012 | ............... F16G 1/10 |
| EP | 1861632 B1 | 5/2017 | |

(Continued)

OTHER PUBLICATIONS

International Search Report dated Dec. 23, 2020 of International Application PCT/EP2020/079163 on which this application is based.

*Primary Examiner* — Gene O Crawford
*Assistant Examiner* — Emily R Kincaid
(74) *Attorney, Agent, or Firm* — Gregory Adams; Richard Wolf

(57) ABSTRACT

The invention relates to a drive belt (1) having a main body into which one or more tension strands (3) composed of para-aramid in cord construction are embedded, wherein each tension strand (3) has twisted plies each formed from at least one twisted yarn, and wherein the turning direction of the respective ply (first twist) is the opposite of the turning direction of the cord (final twist).

Figure 1:
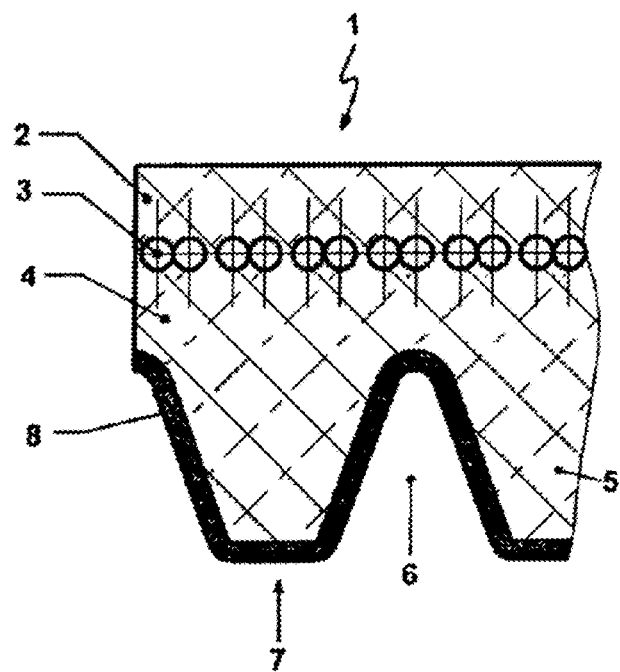

It is a feature of the invention that the tension strands (3) each have at least four plies, wherein the twist factor $TM_1$ of (Continued)

the plies (first twist) is between 4.5 and 5.4, and the twist factor $TM_2$ of the cord (final twist) is between 2.7 and 3.8, and the ratio of the twist factor of the plies to the twist factor of the cord ($TM_1/TM_2$) is between 1.3 and 1.5.

20 Claims, 1 Drawing Sheet

(51) Int. Cl.
*D02G 3/04* (2006.01)
*D02G 3/26* (2006.01)
*D02G 3/28* (2006.01)
*D02G 3/40* (2006.01)
*D02G 3/44* (2006.01)
*D07B 3/00* (2006.01)
*F16G 1/10* (2006.01)
*F16G 5/20* (2006.01)

(52) U.S. Cl.
CPC ............. *D02G 3/286* (2013.01); *D02G 3/404* (2013.01); *D02G 3/446* (2013.01); *D02G 3/447* (2013.01); *D07B 3/005* (2013.01); *F16G 1/10* (2013.01); *F16G 5/20* (2013.01); *D10B 2331/021* (2013.01)

(58) Field of Classification Search
CPC ........ D02G 3/286; D02G 3/404; D02G 3/446; D02G 3/447; D07B 3/005; D10B 2331/021
USPC .......................................................... 474/260
See application file for complete search history.

(56) References Cited

U.S. PATENT DOCUMENTS

| | | | |
|---|---|---|---|
| 2017/0045116 A1* | 2/2017 | Kobayashi | F16G 1/08 |
| 2018/0023663 A1* | 1/2018 | Speer | F16G 5/20 |
| | | | 474/261 |
| 2018/0313028 A1* | 11/2018 | Tomoda | D06M 15/693 |
| 2019/0085938 A1* | 3/2019 | Yoshida | B62D 5/0424 |
| 2019/0248184 A1* | 8/2019 | Guillaumain | B60C 9/005 |

FOREIGN PATENT DOCUMENTS

| | | | | |
|---|---|---|---|---|
| EP | 3530783 A1 * | 8/2019 | | D02G 3/28 |
| EP | 3530783 A1 | 8/2019 | | |
| WO | 2006102641 A1 | 9/2006 | | |
| WO | 2012143241 A1 | 10/2012 | | |
| WO | 2018074471 A1 | 4/2018 | | |

* cited by examiner

DRIVE BELT, USE OF A DRIVE BELT OF THIS TYPE AS A V-RIBBED BELT, AND PRODUCTION METHOD

The invention relates to a drive belt according to the preamble of claim 1. The invention further relates to use and production of such a drive belt.

Drive belts, especially in the form of V-ribbed belts for belt-starter generators in modern hybrid or mild hybrid vehicles, are subject to very high stresses. Therefore, in the last few years, tension strands have increasingly been embedded into the main body of drive belts, including para-aramid in cord constructions. Para-aramid cords impart particularly high tensile strength, dimensional stability and longitudinal rigidity to the drive belt.

For example, WO 2006/102641 A1 and WO 2012/143241 A1 each disclose drive belts with tension strands composed of para-aramid in cord constructions. Each tension strand has twisted plies, each formed from at least one twisted yarn. The direction of rotation of each ply here is the opposite of the direction of rotation of the cord.

In the context of the present application, a yarn refers to any linear structure manufactured from fibrous textile materials. Such fibrous materials may be fibers, especially spun fibers or filaments. Filaments refer more particularly to fibers having at least a length of 1000 mm. A ply is in turn formed from one or more yarns.

Plies are preferably formed by twisting of one or more yarns. This twisting is also called twining. Twisting of untwisted yarns or an untwisted yarn is referred to as the first twist. The result of a first twist may be a ply. The twisting of one or more first twists, for example one or more plies, gives rise to the final twist. A cord or a tension strand composed of one or more plies may be the result of the final twist.

The term "cord" is used synonymously hereinafter for cords twisted in 2 stages. These cords have plies twisted together, with the twist referred to as "final twist". The plies are in turn formed by the twisting of one or more yarns. The twisting thereof is referred to as "first twist".

The prior art recognized that the manner of twisting or twining of the first twist and final twist can crucially influence the properties of a drive belt. Therefore, the prior art already defined a twist factor, recognizing that the ratio between the twist factor of the plies and the twist factor of the cords was of high significance with regard to the properties of a later drive belt. Prior publications WO 2006/102641 A1 and WO 2012/143241 A1 which form the generic class utilize different formulae for calculation of the twist factor or twist multiplier. In the context of the present application, the calculation according to WO 2006/102641 A1 is employed. The twist factor TM is calculated as follows:

$$TM = \frac{TPM/39.4}{\sqrt{5905/T}}$$

where TM denotes the twist factor, TPM the number of turns per meter, and T the yarn fineness or linear density in the unit dtex.

Even though the known drive belts already have high tensile strength, dimensional stability and longitudinal rigidity, demands on the drive belts are increasing in view of the further development of vehicle technology, especially for belt-starter generators. For instance, it has been found that even drive belts with tension strands made of para-aramid can break comparatively quickly in operation. This is especially true under dynamic stress, which is particularly high in the case of belt-starter generators. Furthermore, tension strands of drive belts that are subject to high dynamic stress have the tendency to unwind from the unprotected belt edge. This often results in destruction of the belt in operation.

Drive belts are typically produced as a continuous tube and then cut into individual belt sections. This ensures that the drive belt itself remains seamless and hence has high stability. However, drive belts with tension strands consisting of para-aramid have very poor cuttability. The cut edges of the drive belts often have a fluffy appearance, which is rated as a defect by customers. Furthermore, in overload tests with otherwise comparable belts (with identical para-aramid cords), shorter service lives tend to be observed in the belts where the cut edges were noticeably fluffy.

Against this background of increased demands on drive belts, especially with regard to the stability thereof under high dynamic stress and resistance thereof to the unwinding of tension strands, and in terms of an esthetically pleasing belt edge, there was thus a need for further development.

The basis of the further development is the object of specifying a drive belt, in the case of which unwinding of the tension strands under high dynamic stress and in the transmission of high load is avoided, which also has high durability, with particular avoidance of tearing of the drive belt, and which has a belt edge with a low level of fluff, i.e. can be cut in the production process with a low level of fluff. It is a further object of the invention to specify the use of such a drive belt as V-ribbed belt, and a process for production of such a drive belt.

This object is achieved in accordance with the invention with regard to the drive belt by the subject matter of claim 1, with regard to the use by the subject matter of claim 13, and with regard to the production process by the subject matter of claim 14.

Thus, the invention is based on the concept of specifying a drive belt having a main body into which one or more tension strands composed of para-aramid are embedded in cord construction. Each tension strand has twisted plies, each formed from at least one twisted yarn. The direction of rotation of each ply here is the opposite of the direction of rotation of the cord. According to the invention, the tension strands each have at least four plies, where the twist factor TM1 of the plies (first twist) is between 4.5 and 5.4, and the twist factor TM2 of the cord (final twist) is between 2.7 and 3.8. According to the invention, the ratio of the twist factor of the plies (first twist) to the twist factor of the cord (final twist) is between 1.3 and 1.5.

It has been found via a multitude of experiments and extended tests that the drive belt of the invention has distinctly improved properties compared to the drive belts from the prior art and hence meets the increased demands on drive belts for modern belt-starter generators or hybrid vehicles.

The utilization of four plies in each case for the tension strand, as opposed to the two or three plies that are utilized for the tension strand of the drive belt according to WO 2012/143241 A1, results in improved resistance of the drive belt to unwinding of the tension strand. In multiple series of experiments, it has also been found that, surprisingly, a narrow range for the ratio of the twist factors, namely between 1.3 and 1.5, leads to a distinct improvement in the durability of the drive belt. The drive belt of the invention can therefore withstand very high dynamic stresses. More particularly, the tension strands do not unwind even in the case of high transmission of load. In the durability test, by comparison with drive belts from the prior art, longer service lives were attained before failure of the belt (for example as a result of losses of substructure after dynamic fatigue and/or thermal aging of the substructure material). No tearing of the belt in operation was observed.

Particularly good properties of the drive belt are attained when the ratio of the twist factor of the plies to the twist factor of the cord is between 1.35 and 1.45.

In order to achieve these twist factors and additionally to positively influence the properties of the drive belt, it is appropriate when each ply has a twist between 410 m$^{-1}$ and 490 m$^{-1}$. The cords (final twist) may advantageously in each case have a twist between 125 m$^{-1}$ and 175 m$^{-1}$. It is particularly preferable when the cords each have a twist between 150 m$^{-1}$ and 170 m$^{-1}$.

Experiments with different yarn fineness have additionally shown that the desired high-quality properties of the drive belt for use in the motor vehicle sector in belt-starter generator applications are attained when the plies each have a linear density between 800 dtex and 1200 dtex. Particular preference is given to a linear density of 1100 dtex.

Even though the properties of the drive belt, especially with regard to tensile strength, dimensional stability and longitudinal rigidity, are determined to a crucial degree by the material and the structure of the tension strands, it is nevertheless advantageous when the main body has a fiber-containing top layer and/or a fiber-containing substructure mixture. The top layer and the fiber-containing substructure mixture may each be formed from a polymeric material having elastic properties. It is particularly preferable when the top layer and/or the substructure mixture are formed from a peroxidically crosslinked ethylene-propylene rubber or an ethylene-propylene-diene rubber.

The top layer and the substructure mixture may together form the main body, preferably in the form of a vulcanized rubber mixture comprising at least one rubber component and additives. The rubber component used may especially be an ethylene-propylene rubber, an ethylene-propylene-diene rubber, a (partly) hydrogenated nitrile rubber, a chloroprene rubber, a chlorosulfonated polyethylene, a fluoro rubber, a natural rubber, a styrene-butadiene rubber or butadiene rubber. The rubber component may be unblended or blended with at least one further rubber component.

The additives may include at least one crosslinker or crosslinker system. In addition, fillers and/or processing aids and/or a plasticizer and/or an aging stabilizer and/or fibers and/or color pigments may be used as additives.

The top layer and/or the substructure mixture may include fibers consisting of aramid, polyester, polyamide, poly-P-phenylenebenzobisoxazole, cotton, linen, rayon, glass fibers, metal fibers, silicate fibers or other fiber materials that are customary in the rubber industry. The fibers may be aligned parallel to the longitudinal or transverse direction of the direction of the belt circumference. It is also possible that there is a different alignment of the fibers in the top layer and in the substructure of the belts.

It is also preferable when the tension strands are embedded into the main body in a tension strand layer between the top layer and the substructure mixture. It is possible here for the top layer and the substructure mixture to be bonded to one another in the production process such that the top layer is indistinguishable from the substructure mixture in the drive belt as the end product. The tension strands may thus be embedded fully into the uniform main body.

The tension strands may in principle be provided with a stripping preparation and/or be coated with an adhesive in order to facilitate or improve embedding into the main body.

It is particularly preferable when the tension strand density in the drive belt is between 80 and 130 tension strands per 100 mm of belt width. More particularly, it is possible to provide between 90 and 120, preferably between 100 and 110, more preferably 105, tension strands per 100 mm of belt width. It has been found that such a tension strand density forms a good compromise between tensile strength and lateral stability of the drive belt.

In a very particularly preferred embodiment of the invention, the plies have a twist of 450 m$^{-1}$ and the cords each have a twist of 160 m$^{-1}$. In this embodiment, it may especially be the case that the plies each have a linear density of 1100 dtex. The tension strand more preferably comprises exactly four plies each formed from a single twisted yarn. In this respect, it is thus preferable when the tension strand is formed from one 1100×1×4 cord, 450/160 sZ (and/or zS). The plies here are thus twisted in S direction (and/or in Z direction), and the cords each in Z direction (and/or in S direction). For drive belts of the invention, especially V-ribbed belts, preference is given to incorporating two cords with opposite twists (i.e. sZ and zS) in a belt, in which case both cords are wound in parallel (onto the top layer) in the production process.

A secondary aspect of the invention relates to the use of an above-described drive belt as V-ribbed belt in a motor vehicle engine, especially for a belt-starter generator.

The present invention is also concerned with a process for producing the above-described drive belt, wherein four individual yarns or yarn bundles are each twisted with a twist between 410 m$^{-1}$ and 490 m$^{-1}$ to form one individual ply in each case, the four plies are then combined and are twisted with an opposite twist between 125 m$^{-1}$ and 175 m$^{-1}$ to form a cord, wherein a twist factor $TM_1$ between 4.5 and 5.4 is established for each of the plies and a twist factor $TM_2$ between 2.7 and 3.8 for each of the cords and a ratio of the twist factor of the plies to a twist factor of the cords ($TM_1/TM_2$) between 1.3 and 1.5.

Preferably, in one embodiment of the production process of the invention, a twist of 450 m$^{-1}$ is established for each of the four plies and a twist of 160 m$^{-1}$ for the cords.

Figure 2:
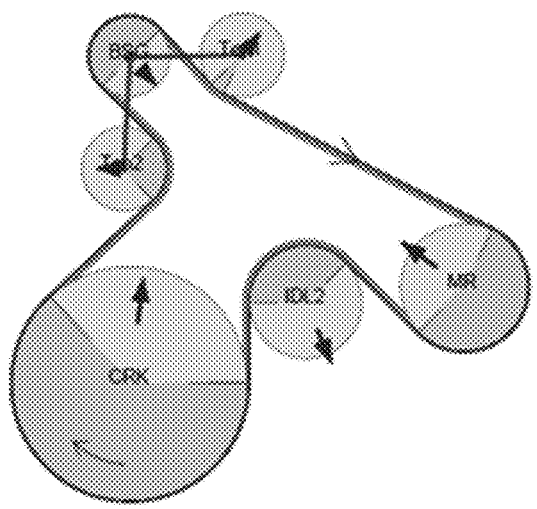
Figure 3:
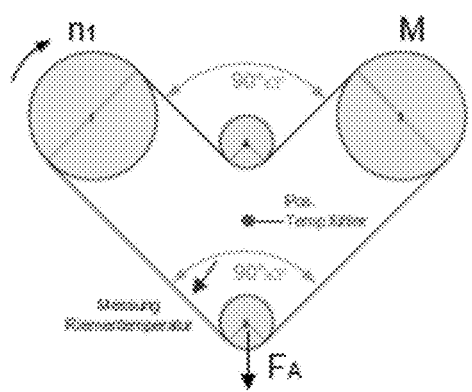

The invention is elucidated in detail hereinafter by a working example with reference to the appended schematic drawings. The figures show:

FIG. 1 a partial cross section through a drive belt of the invention in a preferred working example;

FIG. 2 a roll arrangement of a mild hybrid test for the drive belt according to FIG. 1; and FIG. 3 a roll arrangement of a constant high-load test for the drive belt according to FIG. 1.

FIG. 1 shows a drive belt in partial section, having a main body formed from an outer layer 2 and a substructure mixture 4. Extending between the top layer 2 and the substructure mixture 4 is a tension strand layer composed of multiple tension strands 3. The tension strands 3 are preferably arranged parallel to one another. It is also conceivable that the tension strands 3 are in an offset arrangement relative to one another.

The drive belt 1 shown in FIG. 1 takes the form of a V-ribbed belt. For this purpose, the substructure 4 has multiple ribs 5 arranged parallel to one another, delimited from one another by grooves 6. The opposite side of the substructure mixture 3 from the tension strands 3 or from the top layer 2 forms a force transmission surface 7 that extends via the ribs 5 and through the grooves 6.

The force transmission surface 7 may have a coating 8. The coating 8 may be a flock coating, especially with a cotton flock or aramid flock. It is also possible to use an applied textile layer as coating 8. The textile layer may take the form of a weave, loop-formed knit or loop-drawn knit. The coating 8 preferably results in wear protection and sound insulation.

An essential factor for the improvement in properties of the drive belt 1 over the prior art is the formation of the individual tension strands 3. Each tension strand 3 preferably has at least four, especially exactly four, plies. The twist factor TM1 of the plies here is between 4.5 and 5.4, and the twist factor TM2 of the cords is between 2.7 and 3.8. More particularly, for the tension strands 3 in the drive belt 1 of the invention, the ratio of the twist factor of the plies to the twist factor of the cords (TM1/TM2) is between 1.3 and 1.5, preferably between 1.35 and 1.45.

On the way to the present invention, multiple V-ribbed belts were constructed with a fiber-containing top layer and a fiber-containing substructure mixture with various aramid tension strands. The top layer and/or the substructure mixture consist of peroxidically crosslinked ethylene-propylene-diene rubber (EPDM). The filament yarn used was the aramid type T1008 (1100 dtex) from Teijin Limited. The tension strand length was generated by parallel winding of 2 cords with different directions of rotation (sZ and zS) with the 1100×1×4 construction. The cords were each provided with a stripping preparation and coated with an adhesive.

In all the drive belts tested, the tension strand density in the drive belt was 105 tension strands per 100 mm of belt width. Drive belts of different width were cut off the original tube, and the cut edges were assessed visually. The length of the drive belts was about 1200 mm in each case. The drive belts were also tested for dynamic lifetime in a mild hybrid test and a constant high-load test, and the resistance to unwinding of the tension strands was assessed.

Specifically, the drive belts were each subjected to a CT Mild Hybrid Test (6PK1196) and a Constant High Load Test (4PK1196).

In the mild hybrid test, the drive belt runs alternately with its top layer and its substructure mixture over six rolls having different diameters. The arrangement of the rolls in the mild hybrid test is shown in FIG. 2. A drive roll BSG applies a torque to the drive belt according to a fixed test cycle. Each test cycle comprises a start section, a boost section, a recuperation section and a baseload section. The total duration of the test cycle is 20 seconds. In the start and boost sections of the test cycle, the drive pulley has an accelerating effect on the belt, while it decelerates the belt in the recuperation section and in the baseload section.

The starting section is comparatively short, although a high torque of the generator pulley, especially about 60 Nm, acts on the drive belt. In the longer-lasting boost section, a lower torque acts on the belt. It is only about half of the starting torque, i.e. about 30 Nm. The recuperation section is of similar duration to the boost section, with a torque of about −30 Nm. The longest section is the baseload section, in which there is a constant torque of about −5 Nm. The ambient temperature during the mild hybrid test was set to 130° C.

In the constant high-load test, the drive belt runs alternately with its top layer and its substructure mixture over four rolls, with a drive roll at a speed of rotation of 5000 revolutions per minute applying a constant torque of 20 Nm. The arrangement of the rolls in the mild hybrid test is shown in FIG. 3. The ambient temperature during the constant high-load test was set to 100° C.

All drive belts were subjected to the same tests, with repetition of the test cycle until the drive belt tore or the tension strands were unwound from the drive belt or the substructure of the belt had at least 3 partial breaks or a loss of material. The test results are apparent from the table below, with the drive belt having test cord No. 6 being constructed in accordance with the invention. These drive belts achieved the best results overall. This is clear from the ultimate service lives in the different tests. The comparative drive belts could not achieve such long test service lives.

| Experimental cord | First twist TM1 [m⁻¹] | Final twist TM2 [m⁻¹] | Twist factor of first twist TM1 | Twist factor of final twist TM2 | Quotient TM1/TM2 | CT Mild Hybrid Test, 6PK1196, service life [h] | Constant High Load Test, 4Pk1196, service life [h] | Visual assessment of cut edge |
|---|---|---|---|---|---|---|---|---|
| Target service life | | | | | | >150 h | >70 h | |
| 1 | 270 | 270 | 2.96 | 5.91 | 0.50 | 74 ... 84 h | 38 ... 48 h | + |
| 2 | 300 | 105 | 3.28 | 2.30 | 1.43 | 74 ... 94 h | 124 ... 163 h | − |
| 3 | 360 | 126 | 3.94 | 2.76 | 1.43 | 50 ... 291 h | 161 ... 182 h | o |
| 4 | 360 | 200 | 3.94 | 4.38 | 0.90 | — | 58 ... 64 h | + |
| 5 | 450 | 100 | 4.93 | 2.19 | 2.25 | 164 ... 400 h | 8 ... 63 h | − |
| 6 | 450 | 160 | 4.93 | 3.50 | 1.41 | 224 ... 421 h | 74 ... 184 h | + |
| 7 | 450 | 190 | 4.93 | 4.16 | 1.18 | 44 ... 96 h | 1 ... 20 h | + |

Especially experimental cord No. 5, which had a twist factor ratio according to WO 2006/102641 A1, shows a distinct variance in the ultimate service lives in the two tests, especially in the constant high-load test, and a belt edge with a high level of fluff. The drive belt of the invention (experimental cord No. 6) achieves longer ultimate service lives both in the mild hybrid test and in the constant high-load test. Moreover, the drive belt thus configured shows a cut edge with a very low level of fluff.

LIST OF REFERENCE SIGNS (Part of the Description)
1 Drive belt
2 Top layer
3 Tension strand
4 Substructure mixture
5 Rib
6 Groove
7 Force transmission surface
8 Coating

The invention claimed is:
1. A drive belt (1) comprising a main body into which one or more tension strands (3) composed of para-aramid in cord construction are embedded, wherein each tension strand (3) has twisted plies each formed from at least one twisted yarn, and wherein the turning direction of the respective ply (first twist) is the opposite of the turning direction of the cord (final twist);

wherein the tension strands (3) each have at least four plies, wherein a twist factor ($TM_1$) of the plies (first twist) is between 4.5 and 5.4, and a twist factor ($TM_2$) of the cord (final twist) is between 2.7 and 3.8; and, wherein a ratio ($TM_1/TM_2$) of the twist factor of the plies to the twist factor of the cord is between 1.3 and 1.5.

2. The drive belt as claimed in claim 1, wherein the ratio ($TM_1/TM_2$) of the twist factor of the plies to the twist factor of the cords is between 1.35 and 1.45.

3. The drive belt as claimed in claim 1, wherein the plies have a twist (first twist) between 410 $m^{-1}$ and 490 $m^{-1}$.

4. The drive belt as claimed in claim 1, wherein the cords each have a twist (final twist) between 125 $m^{-1}$ and 175 $m^{-1}$.

5. The drive belt as claimed in claim 4, wherein the cords each have the twist (final twist) between 150 $m^{-1}$ and 170 $m^{-1}$.

6. The drive belt as claimed in claim 1, wherein the plies each have a linear density between 800 dtex and 1200 dtex.

7. The drive belt as claimed in claim 6, wherein the plies each have the linear density of 1100 dtex.

8. The drive belt as claimed in claim 1, wherein the top layer of the main body is a fiber-containing top layer and a fiber-containing substructure mixture (4), each formed from a polymeric material having elastic properties.

9. The drive belt as claimed in claim 1, wherein the polymeric material is peroxidically crosslinked ethylene-propylene rubber or peroxidically crosslinked ethylene-propylene-diene rubber.

10. The drive belt as claimed in claim 1, wherein the one or more tension strands are embedded into the main body in a tension strand layer between the top layer and a substructure mixture (4).

11. The drive belt as claimed in claim 1, wherein the one or more tension strands have been provided with a stripping preparation.

12. The drive belt as claimed in claim 1, wherein the one or more tension strands have been coated with an adhesive.

13. The drive belt as claimed in claim 1, wherein the one or more tension strands have been provided with a stripping preparation and coated with an adhesive.

14. The drive belt as claimed in claim 1, wherein the drive belt has tension strand density of between 80 and 130 tension strands per 100 mm of belt width.

15. The drive belt as claimed in claim 14, wherein the tension strand density is between 100 and 110 tension strands per 100 mm of belt width.

16. The drive belt as claimed in claim 1, wherein the drive belt is a V-ribbed belt.

17. The drive belt as claimed in claim 1, wherein the plies have a twist of 450 $m^{-1}$ and the cords each have a twist of 160 $m^{-1}$.

18. The drive belt as claimed in claim 1, wherein the drive belt is a V-ribbed belt disposed in a motor vehicle engine as a belt-starter generator.

19. The drive belt as claimed in claim 1, wherein four yarns or yarn bundles are each twisted with a twist (first twist) between 410 $m^{-1}$ and 490 $m^{-1}$ to form one individual ply in each case, the four plies are then combined and are twisted with an opposite twist (final twist) between 125 $m^{-1}$ and 175 $m^{-1}$ to form a cord, wherein a twist factor $TM_1$ between 4.5 and 5.4 is established for each of the plies and a twist factor $TM_2$ between 2.7 and 3.8 for each of the cords and the ratio ($TM_1/TM_2$) of the twist factor of the plies to the twist factor of the cord between 1.3 and 1.5.

20. The drive belt as claimed in claim 19, having a twist of 450 $m^{-1}$ for each of the four plies and a twist of 160 $m^{-1}$ for the cords.

* * * * *